United States Patent
Armstrong et al.

(10) Patent No.: US 7,228,755 B2
(45) Date of Patent: Jun. 12, 2007

(54) RELEASE CAPSULE FOR STEERING COLUMN

(75) Inventors: Ray G. Armstrong, Bay City, MI (US); Richard K. Riefe, Saginaw, MI (US); Ravindra Jwalapathy, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 48 days.

(21) Appl. No.: 11/094,868

(22) Filed: Mar. 31, 2005

(65) Prior Publication Data

US 2006/0226646 A1 Oct. 12, 2006

(51) Int. Cl.
*B62D 1/18* (2006.01)
(52) U.S. Cl. .................... 74/493; 280/777
(58) Field of Classification Search .......... 74/492, 74/493; 248/900, 548; 280/777
See application file for complete search history.

(56) References Cited

U.S. PATENT DOCUMENTS

| | | | | |
|---|---|---|---|---|
| 4,452,096 A | | 6/1984 | Workman | 74/492 |
| 4,643,610 A | * | 2/1987 | Bien | 403/326 |
| 4,884,778 A | * | 12/1989 | Yamamoto | 248/548 |
| 5,425,553 A | * | 6/1995 | Yazane et al. | 280/777 |
| 5,788,279 A | * | 8/1998 | Pfannebecker | 280/777 |
| 5,944,348 A | | 8/1999 | Boyle, III et al. | 280/777 |
| 5,979,860 A | * | 11/1999 | Jurik et al. | 248/548 |
| 6,062,100 A | * | 5/2000 | Sarsfield et al. | 74/492 |
| 6,176,151 B1 | | 1/2001 | Cymbal | 74/492 |
| 6,378,903 B1 | * | 4/2002 | Yabutsuka et al. | 280/777 |
| 6,592,148 B2 | | 7/2003 | Byers et al. | 280/777 |
| 6,659,504 B2 | | 12/2003 | Riefe et al. | 280/777 |
| 6,761,376 B2 | | 7/2004 | Riefe et al. | 280/777 |
| 6,799,486 B2 | * | 10/2004 | Manwaring et al. | 74/493 |
| 6,799,780 B2 | | 10/2004 | Anspaugh et al. | 280/777 |
| 6,851,712 B2 | * | 2/2005 | Park et al. | 280/775 |
| 2005/0200113 A1 | * | 9/2005 | Cymbal et al. | 280/777 |

* cited by examiner

*Primary Examiner*—Richard Ridley
*Assistant Examiner*—James Pilkington
(74) *Attorney, Agent, or Firm*—Michael D. Smith (57) ABSTRACT

A vehicular steering column assembly (16) comprises a support bracket (26) which is joined to an outer, non-rotating sleeve (22). A release capsule (30) is releasably joined to a mounting surface (28) of the support bracket (26) via a plurality of spherical bodies (56) whose protruding crowns (52) are seated in corresponding longitudinally-extending furrows (54) in the release capsule (30). Upon the application of sufficient force to the steering column (16), such as during a collision, the support bracket (26) is urged out of engagement with the release capsule (30) with the respective furrows (54) sliding over the crowns (52). The sliding engagement between the crowns (52) and the furrows (54) can be adjusted to establish a highly predictable and consistent release force and which is capable of increasing the frequency value for the steering column (16).

33 Claims, 5 Drawing Sheets

RELEASE CAPSULE FOR STEERING COLUMN

FIELD OF THE INVENTION

This invention relates to a steering column assembly for a motor vehicle, and more specifically to an improved connection between the steering column and the vehicle body.

BACKGROUND OF THE INVENTION

Steering columns for motor vehicles are designed to collapse longitudinally through an energy absorbing stroke in response to an impact on the steering column. For example, in a frontal collision, a driver's chest may impact the steering wheel, causing an axial force along the steering column. The connection which holds the steering column to the motor vehicle body is designed to release in a collision to prevent or reduce injury to the driver's chest.

One typical method of accomplishing this releasable connection is to provide a support bracket on the outer, non-rotating sleeve of the steering column. The support bracket is designed with a releasable mounting surface. A release capsule, in turn, is fixed to the vehicle body and engages the mounting surface of the support bracket in such a manner that, upon the application of sufficient force along the longitudinal axis of the column sleeve, the connection is overcome thus allowing the steering column to collapse along its length. An energy absorbing mechanism may be incorporated into the connection between the release capsule and the support bracket to help control, or dampen, the relative movements.

Although many releasable connection designs and mechanisms have been proposed, a kind frequently employed includes the use of plastic injection-molded sheer pins which pass between the release capsule and the support bracket. Upon the application of sufficient force, these sheer pins yield allowing the support bracket to disengage from the fixed release capsule. While this sheer pin technique is reliable, there are nevertheless certain inherent characteristics of this design which could be improved upon. For example, it would be beneficial to improve the predictability of the release force at which the connection between the release capsule and the support bracket is overcome. That is, because plastic sheer pins can be subject to manufacturing variables, such as injection temperature, injection pressure and spatial clearance between the components, the exact release force necessary to disengage the support bracket from the release capsule can vary from one vehicle to the next. Another example of a characteristic which could be improved relates to engine vibrations transmitted through the steering column to the steering wheel. Because the support bracket and release capsule connection is the mechanism by which the steering column is supported to the vehicle body, vibrations transmitted through the vehicle body pass through this connection to the steering column. The plastic material present in prior art release capsule designs has an inherent softness which can raise the frequency value of the column. This can, in certain circumstances, result in vibrations transmitted to the steering wheel which can be felt by a driver.

Therefore, there is a need to improve release connections for vehicular steering columns for the purpose of providing greater predictability in the release force and lowering the frequency value of the steering column assembly.

SUMMARY OF THE INVENTION AND ADVANTAGES

According to one aspect of the subject invention, a vehicular steering column assembly comprises an outer sleeve which defines a longitudinal axis and has an upper end proximate the steering wheel. An inner steering shaft is rotatably carried in the sleeve. A support bracket fixedly joins the sleeve adjacent its upper end to a vehicle body. The support bracket has a releasable mounting surface. A release capsule is provided for fixed connection to a vehicle body and engages the mounting surface of the support bracket for automatically releasing therefrom upon the application of sufficient force along the longitudinal axis of the sleeve. At least one of the mounting surface and the release capsule has a crown protruding therefrom and the other of the mounting surface and the release capsule has a furrow generally parallel to the longitudinal axis and corresponding in shape to the crown. The crown is seated in the furrow such that upon automatic release of the release capsule from the mounting surface, the crown moves (relatively) along the furrow. This arrangement improves release force predictability during collision and improves resonance control over the steering column assembly during normal operation.

The crown and furrow feature of this invention provides a highly predictably release force which can be calculated by the static and dynamic friction factors which exist between the surface of the crown sliding within the furrow. Contrary to the prior art, this crown and furrow feature is not subject to variables inherent in plastic injection techniques, and by design is capable of providing a stiffer connection by which the frequency value of the steering column can be increased thus avoiding resonance with the engine.

According to another aspect of the invention, a safety release assembly for a vehicular steering column is provided. The safety release assembly is of the type for automatically releasing the steering column from the vehicle structure upon the application of sufficient axial force. The safety release assembly comprises a support bracket for attachment to a steering column. The support bracket has a releasable mounting surface. A release capsule is provided for fixed connection to a vehicular body. The release capsule engages the mounting surface of the support bracket and automatically releases therefrom upon the application of sufficient force. At least one of the mounting surface and the release capsule has a crown protruding therefrom, and the other of the mounting surface and the release capsule has an elongated furrow corresponding in shape to the crown. The crown is seated in the furrow such that upon automatic release of the release capsule from the mounting member, the crown moves (relatively) along the furrow thereby improving release force predictability during a collision and improving resonance control over the steering column during normal operation.

According to a further embodiment of the subject invention, a release capsule for a vehicular steering column is provided. The release capsule is of the type for automatically releasing the steering column from the vehicle structure upon the application of sufficient force. The release capsule comprises an upper plate having an outer surface and an inner surface. The release capsule also includes a lower plate which is generally parallel to the upper plate. The lower plate has an outer surface facing in a direction away from the upper plate and also an inner surface facing toward the upper plate. A strap joins the upper and lower plates to form a generally U-shaped cross section. An elongated furrow is disposed in at least one of the inner surfaces of the upper and lower plates.

And in yet another aspect of the invention, a method of automatically disengaging a vehicular steering column from a vehicular support structure during a frontal collision is provided. The method includes the steps of attaching a release capsule to the vehicular support structure, attaching a mounting surface to the steering column, releaseably joining the release capsule to the mounting surface for automatic release upon the application of sufficient force along a longitudinal axis of the steering column. A rigid crown is formed on either the mounting surface or the release capsule. The crown has a profile shape. A longitudinally extending furrow is formed on the other component (i.e., either the mounting surface or the release capsule). The furrow has a shape corresponding to the profile of the crown. The crown is seated in the furrow so that during a frontal collision the crown will travel along the furrow.

The subject crown and furrow configuration, and its corresponding method, provide a connection between a steering column and a body of a motor vehicle in which the release force needed to disconnect the steering column from the motor vehicle body during a collision can be calculated with reliable precision. Additionally, the crown and furrow configuration enables a stiffer mounting of the steering column to the vehicle body, thus resulting in a higher frequency value for the steering column and reduced vibrations transmitted to the steering wheel.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
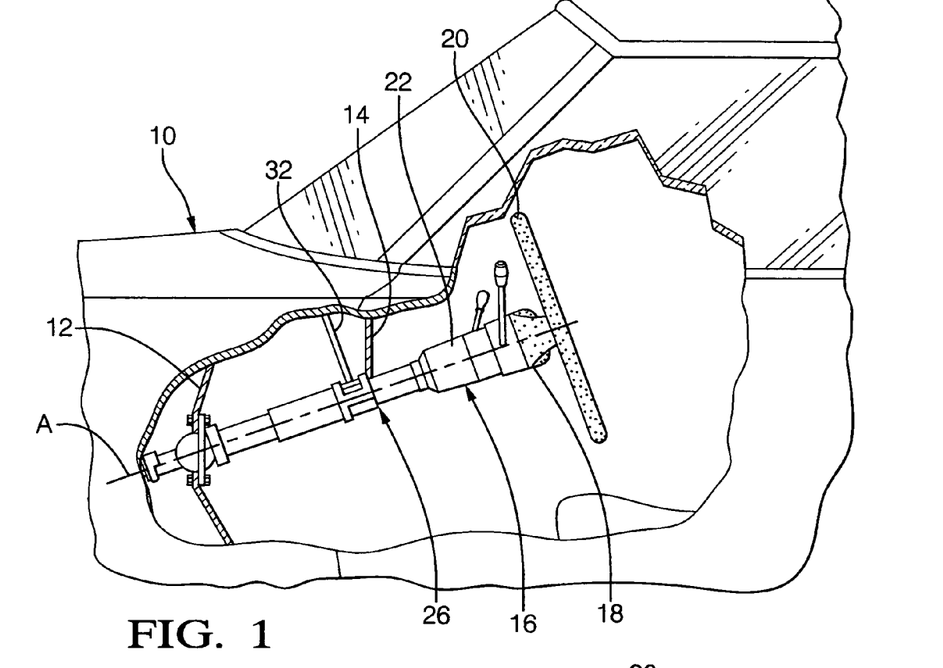
FIG. 1 is a simplified fragmentary view showing a steering column supported in the body of a motor vehicle.

Referring to the figures, wherein like numerals indicate like or corresponding parts throughout the several views, a representation of a typical motor vehicle is generally indicated at 10 in FIG. 1.

The motor vehicle 10 includes the typical firewall 12 and dashboard structure 14 which together form part of the vehicle body. A typical vehicular steering column assembly is generally indicated at 16 in FIG. 1. The steering column assembly 16 may be supported at multiple points upon the vehicle body such as, in the example of FIG. 1, between the firewall 12 and under the dashboard 14. The steering column assembly 16 may be of the non-adjustable type, or of the type which can be adjusted by tilt, by rake, and/or by telescoping movement. Adjacent the upper end 18 of the steering column 16 is provided a steering wheel 20.

Figures 2, 3:
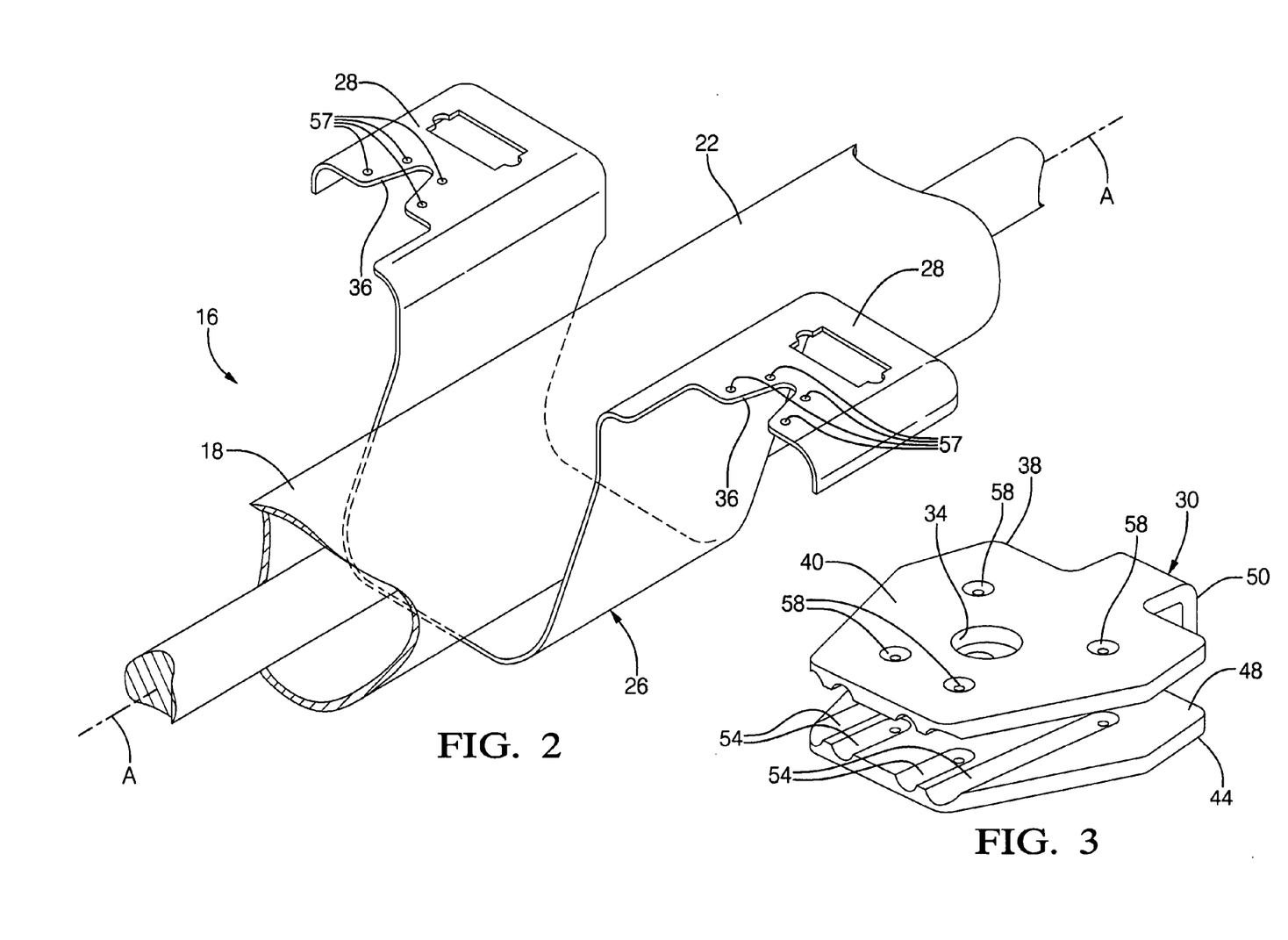
FIG. 2 is a fragmentary perspective view showing a portion of the vehicular steering column and a support bracket according to the invention.
FIG. 3 is a perspective view of a preferred release capsule.
Figure 4:
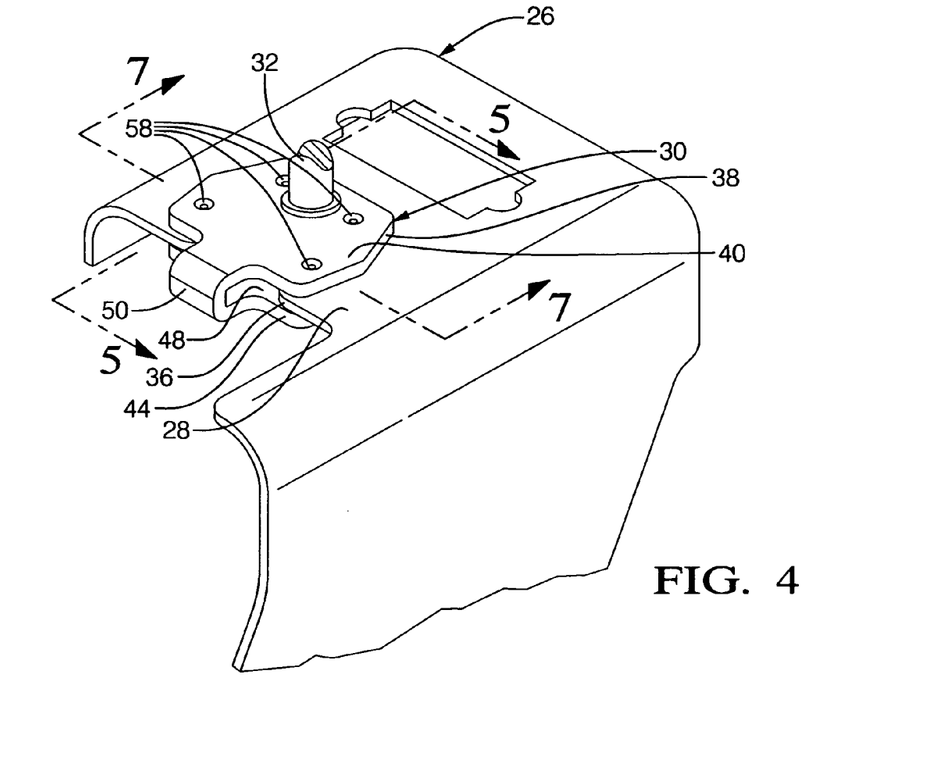
FIG. 4 is a fragmentary perspective view showing a release capsule joined in a normal operating position to a support bracket.

Referring now to FIG. 2, the steering column assembly 16 is shown including an outer sleeve 22 which defines a longitudinal axis A. An inner steering shaft 24 is rotatably carried in the sleeve 22 by interposed bearings and/or bushings (not shown). The steering shaft 24 is connected at one end to the steering wheel 20 and at its other end to a mechanism and/or device which controls angular movement of the dirigible wheels. Near the upper end 18, a support bracket, generally indicated at 26, is fixedly joined to the sleeve 22. The support bracket 26 includes at least one releasable mounting surface 28. The mounting surface 28 may take many forms. In the embodiment shown in FIGS. 2 and 4, the mounting surface 28 comprises a pair of generally horizontal wings extending on opposite sides of the sleeve 22. In alternative embodiments, the mounting surface 28 may comprise one or more vertically oriented features, or other orientations which may be dictated by the vehicular application.

A release capsule, generally indicated at 30 in FIGS. 3–7, is provided for fixed connection to the vehicular body, such as to the underside of the dashboard 14. This fixed connection may take the form of a hanger bolt 32 which passes through a corresponding hanger hole 34. A slot 36 having a generally v-shaped mouth is formed in the mounting surface 28 of the support bracket 26 for receiving the hanger bolt 32. The v-shaped opening in the slot 36 opens forwardly to provide clearance for the hanger bolt 32 during both normal operation when the release capsule 30 is joined to the support bracket 26 and during emergency release conditions when the release capsule 30 disengages from the mounting surface 28.

Figure 5:
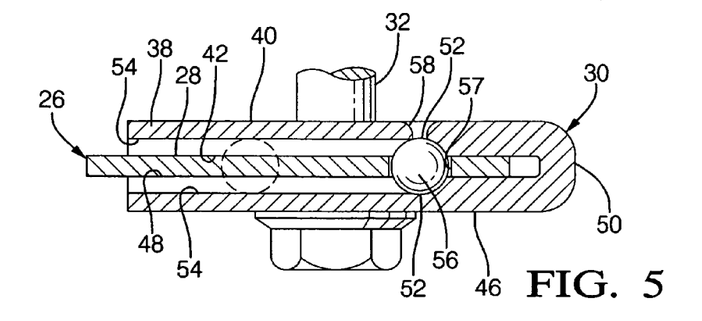
FIG. 5 is a cross-section taken generally along lines 5—5 of FIG. 4.
Figure 6:
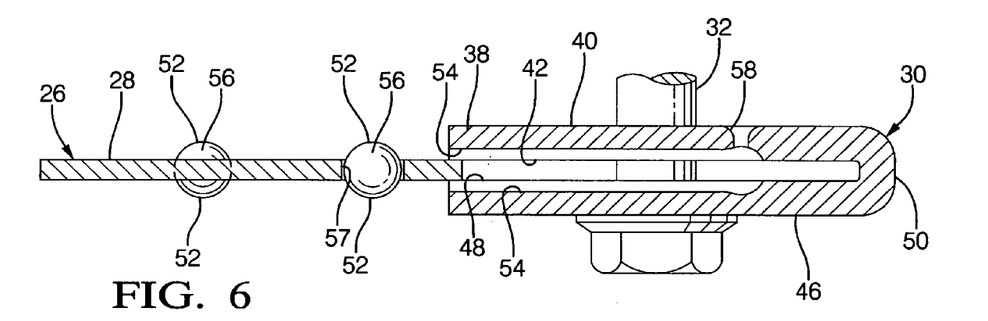
FIG. 6 is a cross-sectional view as in FIG. 5 but showing the support bracket disengaged from the release capsule such as during a collision.

The release capsule 30 is provided with an upper plate 38 having an outer surface 40 and an inner surface 42. The release capsule 30 also includes a lower plate 44 which is generally parallel to the upper plate 38. The lower plate 44 also has an outer surface 46 which faces in a direction away from the upper plate 38, and an inner surface 48 which faces toward the upper plate 38. The upper 38 and lower 44 plates are generally identical in shape to one another in the preferred embodiment, however in other arrangements it may be desirable to alter the shape of one or both of the upper and lower plates 38, 44. A strap 50 joins the upper 38 and lower 44 plates to form a generally u-shaped cross section as best shown in FIGS. 5 and 6. The release capsule 30 is most advantageously fabricated from a metallic material, and specifically an aluminum alloy. However, other material alloys and non-metallic materials can be used to fabricate the release capsule 30 without departing from the spirit of the invention.

The predictable and controllable release mechanism of this invention is accomplished by either the mounting surface 28 or the release capsule 30, or perhaps a combination of both, being provided with a protruding crown 52. A furrow 54 is then formed in the opposite mating surface into which the crown 52 is seated. The furrow 54 provides a frictional sliding track along which the crown 52 travels, in relative motion terms, during a collision event. The static (initially) and dynamic friction which exists between the surface of the crown 52 and the track surface of the furrow 54 is highly predictable and dependent upon such typical factors as surface roughness and normal forces. These factors being highly controllable, release force predictability is substantially improved over prior art designs. Furthermore, because it is possible to fabricate the crown 52 and furrow 54 components from materials which are different than plastic injection materials, it is possible to improve the frequency value for the steering column by stiffening its connection to the vehicle body.

Those skilled in the art will readily appreciate that the crown 52 and furrow 54 features can be provided in either the mounting surface 28 or the release capsule 30 or in blended variations. However, with regard to the preferred embodiment of the invention as shown in the accompanying figures, the crown 52 protrudes from the support bracket 26 and the furrow 54 is formed in the release capsule 30. The crown 52 may be formed by a spherical body 56 which is captured in a hole 57 in the mounting surface 28 of the support bracket 26. The spherical body 56 may comprise a commercially available steel ball such as sold for roller bearing and other frictionless applications. Alternatively, the body could be made from non-metallic materials such as ceramics or other materials having a surface roughness, compressibility and other material characteristics as may be desired.

Figure 7:
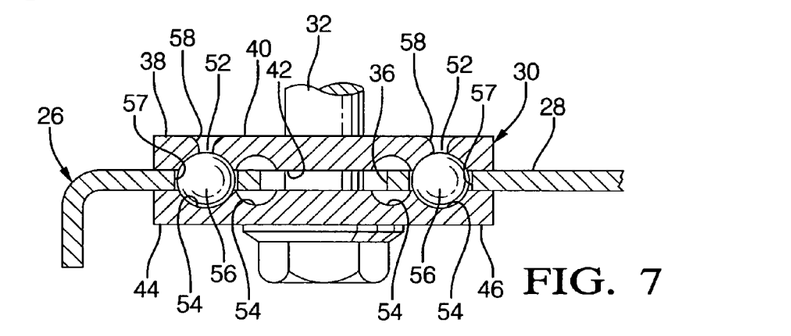
FIG. 7 is a cross-sectional view along lines 7—7 of FIG. 4.
Figure 8:
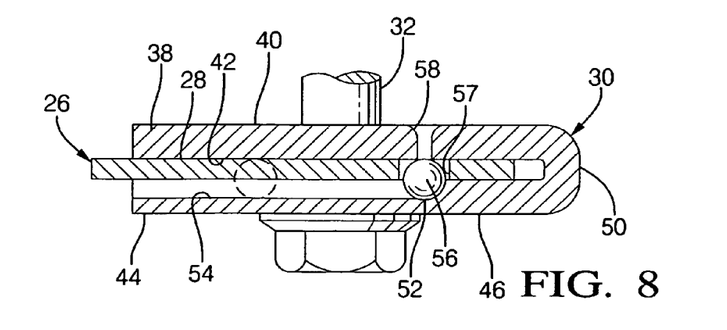
FIG. 8 is a cross-sectional view similar to FIG. 5 yet showing an alternative embodiment of the invention wherein the crown and furrow feature is provided only on one mating surface between the release capsule and the support bracket.

In situations where the crown 52 is formed by a spherical body 56, the furrow 54 is provided with a corresponding semi-circular profile along its length, as shown in FIGS. 3 and 7. The diameter of the spherical body 56 is thus greater than the thickness of the mounting surface 28. As shown in FIG. 5, the body 56 can be positioned centrally within the support bracket 26, so that upper and lower crown portions 52 protrude from opposite sides of the mounting surface 28. In these instances, the inner surfaces 42, 48 of both the upper 38 and lower 44 plates of the release capsule 30 are provided with furrows 54, aligned in opposing relation to receive the respective upper and lower crowns 52 from the single spherical body 56. To provide additional friction between the release capsule 30 and the mounting surface 28, a plurality of spherical bodies 56 can be captured in the mounting surface 28. For example, FIGS. 2–7 illustrate four such spherical bodies 56, each with respective upper and lower crowns 52 which seat in eight corresponding furrows 54 in the respective inner surfaces 42, 48 of the release capsule 30. In an alternative embodiment, FIG. 8 illustrates how four spherical bodies 56 can be captured in the mounting surface 28, but with crowns 52 extending only below the mounting surface 28. In this embodiment, only four furrows 54 would be created in the inner surface 48 of the lower plate 44, with no furrows in the upper plate 38.

In FIGS. 3 and 7, the plurality of furrows 54 are shown as parallel trenches which do not intersect one another. Furthermore, the hanger hole 34 is located so as not to intersect any of the furrows 54 so that during automatic release, the respective crowns 52 traveling along the furrows 54 do not contact the hanger bolt 32.

The release capsule 30 is assembled to the support bracket 26 without the spherical bodies 56, by a simple sliding motion with the mounting surface 28 sandwiched between the upper 38 and lower 44 plates. In the example of FIG. 2, wherein the support bracket 26 includes right and left mounting surfaces 28 on opposing sides of the sleeve 22, one release capsule 30 is associated with each of the right and left mounting surfaces 28. A loading hole 58 may be provided in the upper plate 38, with one loading hole 58 aligned with the terminal end of each furrow 54. The loading holes 58 correspond to the holes 57 formed in the mounting surface 28 which capture the spherical bodies 56. Thus, during the assembly process, the release capsule 30 is positioned on the mounting surface 28 with its loading holes 58 aligned with the corresponding holes 57 in the mounting surface 28. Spherical bodies 56 are then loaded through the loading holes 58 and rest in the lower furrows 54 in the lower plate 44. A crimping or other forming operation is performed on the upper plate 38 to close each loading hole 58 and thereby trap the spherical bodies 56 in position. This is best shown in FIGS. 5 and 7. The loading holes 58 can be closed by alternative methods as well, such as plugging or the like.

During a collision, or otherwise upon the application of sufficient force, the support bracket 26 is pushed out of the release capsule 30 which remains mounted to the vehicle body through the hanger bolt 32. The crowns 52 thus slide along their respective furrows 54 until emerging free from the release capsule 30 as illustrated in FIG. 6. Although the crowns 54 have been described in their preferred form as the exposed part of spherical bodies 56, it will be appreciated that the crowns 52 can be formed by other methods, such as stamping a crown formation in the mounting surface 28. Alternatively, a non-spherical body, such as a cube or other geometric shape, may be introduced. Also, the crowns 52 can be spring-loaded or otherwise designed to exert a controlled normal force against their corresponding furrows 54.

The invention also contemplates a method of automatically disengaging the vehicular steering column assembly 16 from the vehicular support structure 12, 14 during a frontal collision. This method includes the steps of attaching the release capsule 30 to the vehicular support structure 14, attaching a mounting surface 28 to the steering column 16, and releasably joining the release capsule 30 to the mounting surface 28 for automatic release upon the application of sufficient force along a longitudinal axis A of the steering column 16. The step of releasably joining the release capsule 30 to the mounting surface 28 includes the step of forming a rigid crown 52 on either the mounting surface 28, the release capsule 30, or both. The rigid crown is provided with a profile shape. The method also includes the step of forming a longitudinally extending furrow 54 which has a shape corresponding to the profile of the crown 52. The method includes seating the crown 52 in the furrow 54 so that during a frontal collision, the crown 52 will travel (in relative terms) along the furrow 54, thereby providing a predictable release force via the static and dynamic frictional characteristics which exist between the crown 52 and the furrow 54.

The step of forming a rigid crown 52 includes forming the crown 52 in the support bracket 26. The step of forming a longitudinally extending furrow 54 includes forming the furrow 54 in the release capsule 30. The rigid crown forming step also includes forming a semi-spherical profile which is defined by a radius, and then forming the longitudinally extending furrow 54 with a semi-circular cross section which corresponds to the radius of the crown 52. The crown forming step also includes pre-forming a body 56 and capturing that body 56 in the mounting surface 28. The step further includes forming a loading hole 58 in the release capsule 30, inserting the pre-formed body 56 through the loading hole 58, and deforming the loading hole 58 to capture the body 56. And finally, the step of forming a rigid crown 52 includes pre-forming a plurality of bodies 56, e.g. four, and capturing those bodies 56 in the mounting surface 28.

Figure 9:
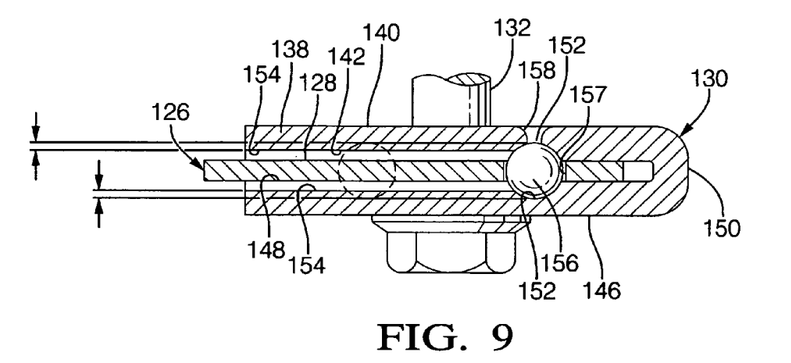
FIG. 9 is a view similar to FIG. 5 but showing a second alternative embodiment of the invention.
Figure 10:
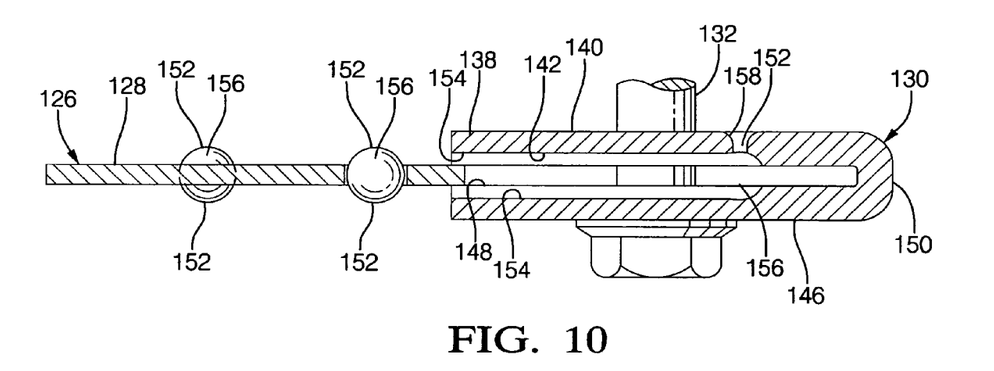
FIG. 10 is a view similar to FIG. 6 showing the support bracket released from the second alternative release capsule.

The invention can take many different forms. For example, a second alternative embodiment of the release capsule 130 is shown in FIGS. 9 and 10, wherein reference numbers corresponding to the preceding examples are used here with a "1" prefix. FIGS. 9 and 10 correspond most directly to FIGS. 5 and 6, however in this second alternative embodiment the furrows 154 are shallower, establishing a plow thickness t along their lengths. During a collision, as the crowns 152 plow through the furrows 154, displacing an amount of material proportional to the plow thickness t. By changing the plow thickness t, the force required to disengage the release capsule 130 from the support bracket 126 can be controlled. It is not necessary that the plow thickness t be equal for all of the furrows 154. For example, the top furrows 154 can have a different plow thickness t than that of the bottom furrows 154.

Figure 11:
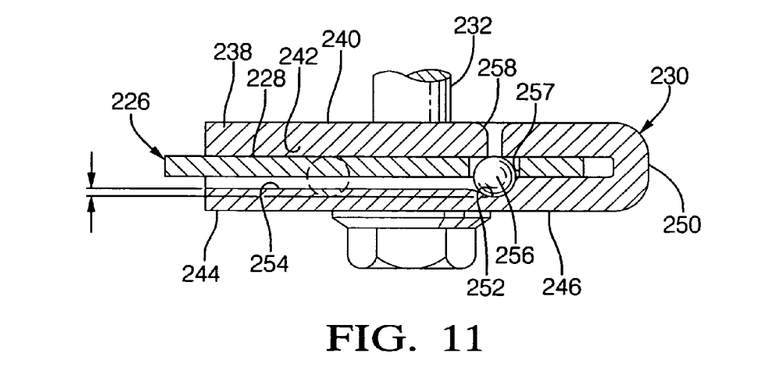
FIG. 11 is a view similar to FIG. 8 showing a third alternative embodiment of the invention.

In a third alternative embodiment of the release capsule 230 shown in FIG. 11, the furrows 254 are formed only in one of the mating surfaces between the release capsule 230 and the support bracket 226. (For convenience, reference numbers in FIG. 11 correspond to those in the preceding examples but with a "2" prefix.) This third alternative embodiment is similar to that shown in FIG. 8, but including the shallow furrow feature described in connection with FIGS. 9 and 10.

Figure 12:
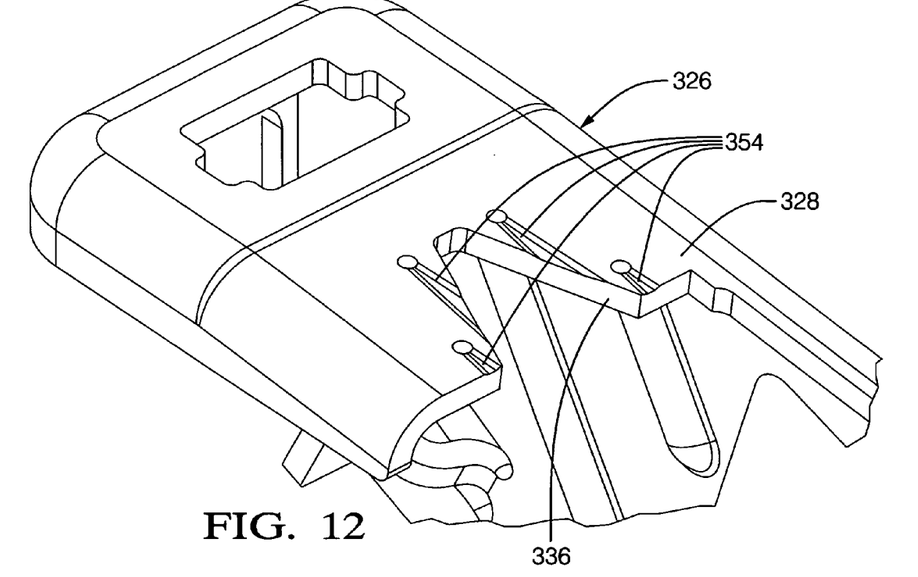
FIG. 12 is a perspective view of the support bracket according to a fourth alternative embodiment of the invention.
Figure 13:
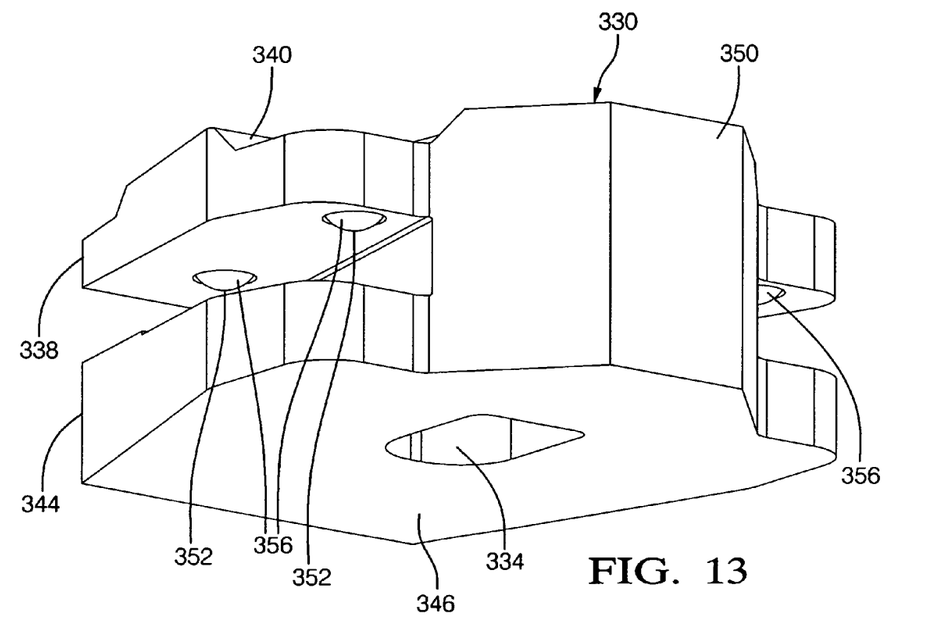
FIG. 13 is a perspective view of the release capsule adapted for the support bracket in FIG. 12.

FIGS. 12 and 13 illustrate a fourth alternative embodiment of the invention, wherein reference numbers corresponding to the preceding examples are used with a "3" prefix. In this fourth alternative embodiment, the support bracket 326 contains the furrows 354 whereas the spherical bodies 356 are contained in the release capsule 330. Further distinctions of this embodiment include longitudinally varying the furrow 354 profile to control the release load. In FIG. 12, the furrows 354 are angled to better accommodate side loading of the column (not shown). Also, the release capsule 330 is reinforced with the strap 350 show extending full length between upper 338 and lower 344 plates. Thus, a transverse cross-section through the release capsule 330 would yield an "H" configuration.

While the invention has been described with reference to these exemplary embodiments, it will be understood by those skilled in the art that various changes may be made and equivalents may be substituted for elements thereof without departing from the scope of the invention. For example, any of the features shown in the primary and various alternative embodiments can be combined with the other disclosed embodiments to form new combinations. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A vehicular steering column assembly comprising:
an outer sleeve defining a longitudinal axis and having an upper end;
an inner steering shaft rotatably carried in said sleeve;
a support bracket fixedly joined to said sleeve adjacent said upper end, said support bracket having a releasable mounting surface;
a release capsule for fixed connection to a vehicular body, said release capsule engaging said mounting surface of said support bracket and automatically releasable therefrom upon the application of sufficient force along said longitudinal axis of said sleeve;
at least one of said mounting surface and said release capsule having a crown protruding therefrom, and the other of said mounting surface and said release capsule having an elongated furrow generally parallel to said longitudinal axis and corresponding in shape to said crown, said crown being seated in said furrow whereby the automatic release of said release capsule from said mounting surface causes relative movement of said crown along said furrow thereby improving release force predictability during a collision and improving resonance control over said steering column assembly during normal operation.

2. The assembly of claim 1 wherein said crown protrudes from said support bracket, and said furrow is formed in said release capsule.

3. The assembly of claim 2 wherein said crown has a circular profile defined by a radius, and said furrow has a semi-circular profile generally corresponding to said radius of said crown.

4. The assembly of claim 1 wherein said crown is formed by a body captured in the at least one of said mounting surface and said release capsule.

5. The assembly of claim 4 wherein said body is captured in said support bracket, and said furrow is formed in said release capsule.

6. The assembly of claim 5 further including a plurality of said crowns.

7. The assembly of claim 6 further including at least three of said crowns.

8. The assembly of claim 5 wherein said body includes an upper and a lower crown, and said release capsule includes upper and lower furrows corresponding to said upper and lower crowns.

9. The assembly of claim 5 wherein said release capsule has an upper plate, a lower plate, and a strap joining said upper and lower plates.

10. The assembly of claim 9 wherein release capsule includes a hanger hole for a hanger bolt, said hanger hole spaced from said furrow.

11. The assembly of claim 10 wherein said mounting surface of said support bracket includes a slot for said hanger bolt.

12. The assembly of claim 11 wherein said slot has a generally v-shaped mouth.

13. The assembly of claim 5 wherein said release capsule includes a crimped loading hole intersecting said furrow.

14. The assembly of claim 5 wherein said support bracket includes right and left mounting surfaces on opposing sides of said sleeve, and one of said release capsules associated with each of said right and left mounting surfaces.

15. A safety release assembly for a vehicular steering column of the type for automatically releasing the steering column from the vehicle structure upon the application of sufficient axial force, said assembly comprising:
  a support bracket for attachment to a steering column, said support bracket having a releasable mounting surface;
  a release capsule for fixed connection to a vehicular body, said release capsule engaging said mounting surface of said support bracket and automatically releasable therefrom upon the application of sufficient force;
  at least one of said mounting surface and said release capsule having a crown protruding therefrom, and the other of said mounting surface and said release capsule having an elongated furrow corresponding in shape to said crown, said crown being seated in said furrow whereby the automatic release of said release capsule from said mounting member causes relative movement of said crown along said furrow thereby improving release force predictability during a collision and improving resonance control over the steering column assembly during normal operation.

16. The assembly of claim 15 wherein said crown protrudes from said support bracket, and said furrow is formed in said release capsule.

17. The assembly of claim 16 wherein said crown has a circular profile defined by a radius, and said furrow has a semi-circular profile generally corresponding to said radius of said crown.

18. The assembly of claim 17 further including a plurality of said crowns.

19. The assembly of claim 15 wherein said crown is formed by a body captured in the at least one of said mounting surface and said release capsule.

20. The assembly of claim 19 wherein said body is captured in said support bracket, and said furrow is formed in said release capsule.

21. The assembly of claim 20 wherein said body includes an upper and a lower crown, and said release capsule includes upper and lower furrows corresponding to said upper and lower crowns.

22. The assembly of claim 20 wherein said release capsule has an upper plate, a lower plate, and a strap joining said upper and lower plates.

23. The assembly of claim 22 wherein release capsule includes a hanger hole for a hanger bolt, said hanger hole spaced from said furrow.

24. The assembly of claim 23 wherein said mounting surface of said support bracket included a slot for said hanger bolt.

25. The assembly of claim 24 wherein said slot has a generally v-shaped mouth.

26. The assembly of claim 22 wherein said release capsule includes a crimped loading hole intersecting said furrow.

27. The assembly of claim 20 wherein said support bracket includes right and left mounting surfaces on opposing sides of said sleeve, and one of said release capsules associated with each of said right and left mounting surfaces.

28. A method of automatically disengaging a vehicular steering column from a vehicular support structure during a frontal collision comprising the steps of:
  attaching a release capsule to the vehicular support structure;
  attaching a mounting surface to the steering column;
  releasably joining the release capsule to the mounting surface for automatic release upon the application of sufficient force along a longitudinal axis of the steering column;
  forming a rigid crown on one of the mounting surface and the release capsule, the crown having a profile shape;
  forming a longitudinally extending furrow on the other of the mounting surface and the release capsule, the furrow having a shape corresponding to the profile of the crown;
  seating the crown in the furrow so that during a frontal collision the crown will travel along the furrow.

29. The method of claim 28 wherein said forming a rigid crown includes forming the crown in the support bracket, and said forming a longitudinally extending furrow includes forming the furrow in the release capsule.

30. The method of claim 29 wherein said forming a rigid crown includes forming a semi-spherical profile defined by a radius, and said forming a longitudinally extending furrow includes forming the furrow with a semi-circular cross-section corresponding to the radius of the crown.

31. The method of claim 29 wherein said forming a rigid crown includes pre-forming a body and capturing the body in the mounting surface.

32. The method of claim 31 further including the step of forming a loading hole in the release capsule, inserting the pre-formed body through the loading hole, and crimping the loading hole to capture the body.

33. The method of claim 29 wherein said forming a rigid crown includes pre-forming a plurality of bodies and capturing the bodies in the mounting surface.

* * * * *